United States Patent [19]
Marzari

[11] Patent Number: 6,156,142
[45] Date of Patent: Dec. 5, 2000

[54] METHOD FOR REPAIRING CONSUMABLE POLYMER-MODIFIED ASPHALT CONTAINERS

[75] Inventor: Jorge A. Marzari, Bolingbrook, Ill.

[73] Assignee: Owens Corning Fiberglas Technology, Inc., Summit, Ill.

[21] Appl. No.: 09/169,965

[22] Filed: Oct. 13, 1998

[51] Int. Cl.[7] .................................................. B32B 35/00
[52] U.S. Cl. ..................... 156/94; 29/402.09; 206/524.7; 428/63
[58] Field of Search ........................... 156/94; 29/402.11, 29/402.09; 428/63; 206/447, 524.7

[56] References Cited

U.S. PATENT DOCUMENTS

| | | |
|---|---|---|
| 3,604,320 | 9/1971 | Duvall . |
| 4,692,195 | 9/1987 | Allen ........................................... 156/94 |
| 5,452,800 | 9/1995 | Muir ........................................ 206/524.7 |
| 5,733,616 | 3/1998 | Janicki ....................................... 206/447 |

*Primary Examiner*—Geoffrey L. Knable
*Attorney, Agent, or Firm*—Inger H. Eckert; James J. Dottavio

[57] ABSTRACT

A method of using repairing cracked or otherwise leaking polymer-modified asphalt-based containers for packaging asphalt. A strip of consumable adhesive tape is adhered to cover and seal the damaged portion of the container. Molten asphalt is then added to the repaired container. The molten asphalt is added to the container at a temperature that is below the melting temperature of the tape. Upon solidification of the asphalt in the repaired container, the entire asphalt package is melted prior to use in a melting apparatus, such as a gas-fired asphalt kettle melter. At the melter temperatures, the tape, container, and packaged asphalt melts or solubilizes in the melted mass.

27 Claims, 3 Drawing Sheets

METHOD FOR REPAIRING CONSUMABLE POLYMER-MODIFIED ASPHALT CONTAINERS

TECHNICAL FIELD AND INDUSTRIAL APPLICABILITY OF THE INVENTION

This invention relates in general to the repair of asphalt-based containers. More particularly, this invention relates to a method utilizing a meltable tape for the repair of molded polymer-modified asphalt-based containers for packaging asphalt.

BACKGROUND OF THE INVENTION

U.S. Pat. No. 5,733,616 issued to Janicki et al. describes injection molded containers made from polymer-modified asphalt for containing raw or processed, e.g., air-blown, asphalt. Molten asphalt is poured into the molded containers at a pouring temperature of about 300° F. Upon solidification of the asphalt by cooling, the filled containers may be stacked for storage and/or transported to the end use location. Typically, the asphalt filled containers are added to a gas-fired asphalt melting kettle for remelting at approximately 450° F.–550° F., preferably less than 530° F. Accordingly, the container is consumable in that the container is melted or solubilized in the kettle for consumption in the end use asphalt application, such as roofing or road paving. The container is molded from a polymer-modified asphalt material which contains by weight about 40% to about 90% asphalt and about 10% to 60% of a polymer material. In the melting kettle, the polymer melts along with the asphalt, and some of the polymer collects on the upper surface of the molten asphalt prior to dissolution to form a skim which significantly reduces fuming of the molten asphalt.

A problem with the molded containers, however, is that they are susceptible to breakage due to impacts during transportation or other rough handling by equipment or workers. While certain advances have been made in making these containers tough and impact-resistant, such rough handling can cause cracks, splits, or holes to appear in the container. Such apertures have rendered the containers unusable since the molten asphalt poured into the containers would leak from the containers. Certain areas of the containers are more susceptible to damage than other areas. These areas include the top center of the longer side, near the injection gates due to higher temperatures, and at the corners. Short shots, that is, containers resulting from molds that are not completely filled with molding material, are especially susceptible to damage. In the past, such damaged containers have been disposed of or ground for compound reuse. These solutions to the problem unnecessarily reduce the efficiency of the container manufacturing process, increase manufacturing costs, and may consume limited landfill or incinerator capacity.

In the past, it has been suggested to repair the damaged containers by applying fiber-reinforced adhesive "duct" tape to the cracks, splits, or holes, but this remedy was found to be unsatisfactory. The glass or textile fiber reinforcements did not melt or solubilize in the remelt kettle. The fibers had a tendency to form undesired clods which were subsequently introduced directly into the asphalt customer's end use.

U.S. Pat. No. 4,692,195 to Allen describes a method for repairing and reinforcing a torn plastic tote. The method entails preparing the tears for plastic welding, welding the tears with a compatible plastic material, and providing a band of plastic reinforcing material around the upstanding sidewalls of the tote and securing the band to the sidewalls. The totes are repaired rather than disposed of. The Allen method does not address the particular requirements of asphalt processing. It is believed that if a weld similar to that shown in the Allen patent were attempted on a polymer-modified asphalt-based container, the weld would be too weak and would fail upon addition of molten asphalt to the welded container.

Accordingly, there continues to be a need for a cost-effective solution to the problem of damaged polymer-modified asphalt-based containers which does not detract from the quality of the asphalt customer's end use application.

SUMMARY OF THE INVENTION

The invention is a method for repairing damaged consumable polymer-modified asphalt containers for packing asphalt. The containers are damaged in that apertures, such as cracks, splits, or holes, in the bottom or side walls of the container, allow molten asphalt to leak from the container during the fill operation. In one respect, the invention is a method of adhering a strip of material to the damaged portion of a consumable polymer-modified asphalt container to prevent molten asphalt from leaking through the damaged portion of the container. The strip does not melt upon addition of the molten asphalt to the repaired container. Upon addition of the repaired container and asphalt contents in the asphalt melting apparatus, the strip material either melts or solubilizes in the asphalt. Preferably, the strip does not contain any substantial quantities of materials which do not either melt or solubilize upon remelting in the asphalt melting apparatus.

In another respect, the invention is a method of improving the structural integrity of a damaged consumable polymer-modified asphalt container by adhering a strip that is substantially devoid of non-assimilable reinforcements, e.g., a non-reinforced strip, to the container before adding molten asphalt to the container.

In another respect, the invention relates to adhering a heat shrinkable adhesive tape across a crack or split in the wall of a container into which a moldable heated liquid is added. The temperature of the liquid is high enough to transfer enough thermal energy to effect shrinkage of the tape, yet low enough not to melt the tape. The tape is typically a uniaxially or biaxially oriented heat shrinkable tape. When adhered to the container to straddle a crack or split in the container, the shrinking action imparts a pulling force to draw more tightly together the portions of the container wall adjacent the crack or split. Accordingly, the risk of molten asphalt leaking from the container is reduced due to both the more-tightly held together damaged portion and the presence of liquid seal-imparting adhesive tape.

In another respect, the invention is a method of using fiber-reinforced adhesive tape to structurally reinforce and seal a damaged container. The adhesive tape does not melt upon addition of molten asphalt to the container. However, the tape and assimilable fiber reinforcements either melt or solubilize in asphalt upon addition of the repaired container to remelted asphalt at approximately 450° F.–550° F., preferably less than 530° F.

In another respect, the invention is an adhesive tape that is pigmented to match the color, luster, and other visual characteristics of a consumable polymer-modified asphalt-based container adapted for packaging asphalt. The pigmented tape is adhered to the container to reinforce and seal cracks, splits, holes or other apertures in the wall of a damaged container through which molten asphalt added to the container might otherwise leak. The pigmented tape is especially advantageously adhered to the outside surface of the damaged container. The similarity in visual appearance tends to camouflage the tape thereby improving the aesthetics of the repaired container.

In another respect the invention is an actively cooled metal jig, e.g., by a cooling fluid such as forced air, in which the damaged container is supported. The jig shape corresponds to that of the container. The jig is in close heat transfer contact with the outside wall of the container. The container is preferably cooled before molten asphalt is added. Preferably, it is cooled to such an extent that upon addition of molten asphalt to the container, the cracks, splits, holes, or other apertures through which molten asphalt might otherwise flow are filled with asphalt that very quickly solidifies due to the cooled container and mating jig wall. Accordingly, without the use of a seal-imparting strip of material adhered to the container, the crack, split, hole, or other aperture is plugged by the cooled asphalt added to the container in molten form.

DETAILED DESCRIPTION AND PREFERRED EMBODIMENTS OF THE INVENTION

Figure 1:
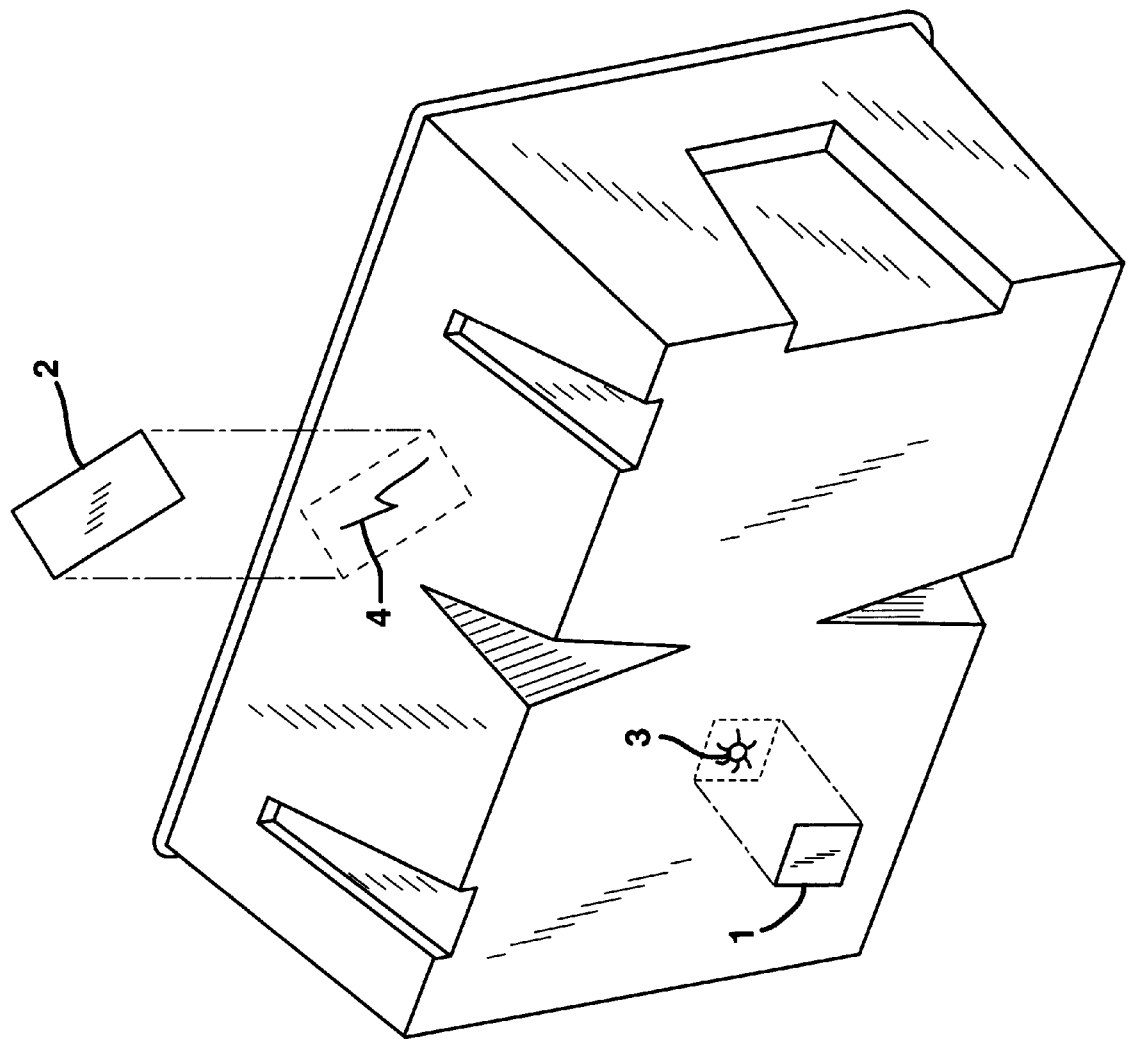
FIG. 1 is a perspective view of adhesive tape being used to repair a crack and a hole in a damaged polymer-modified asphalt-based container.

FIG. 1 shows the application of a strip of material to the outside wall of a damaged polymer-modified asphalt-based container for packaging asphalt. The damage constitutes a crack 4 and a hole 3. Strip 2 is adhered to the container overlying crack 4. Another strip 1 is adhered to the container overlying hole 3. The adherence of the strips to the container prevents molten asphalt added to the container in a subsequent step from leaking from the container.

Figure 2A:
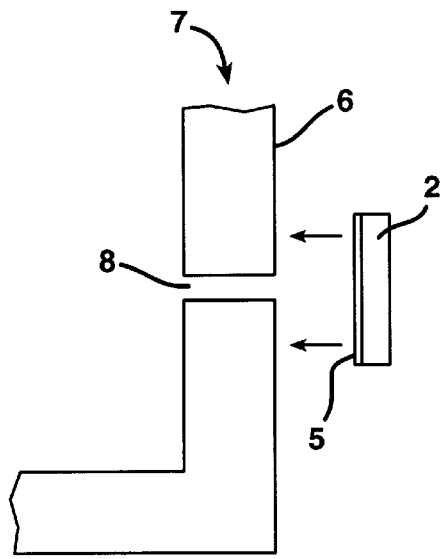
FIG. 2A and FIG. 2B are cross-sectional elevation views of a strip being adhered to an outside wall of a polymer-modified asphalt-based container to seal an aperture in the container wall.
Figure 2B:
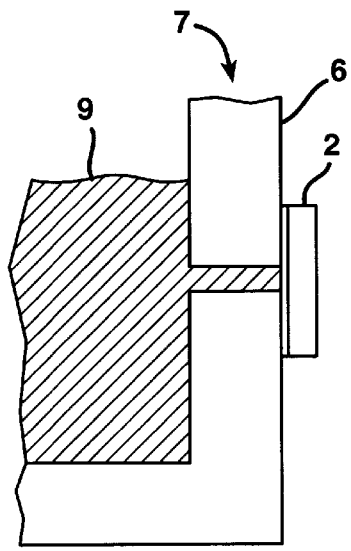

FIG. 2A–FIG. 2B shows one embodiment of the method of the invention. In FIG. 2A, a strip 2 having an adhesive 5 coated on one side thereof is adhered to the outside surface 6 of a container 7 for receiving molten asphalt. The container is damaged and not suitable for containing molten asphalt due to the presence of an undesired aperture 8 in the wall of the container. The adhesive strip 2 is applied to the container so as to overly the aperture. The adhered strip provides structural reinforcement to the damaged portion of the container. The container may be supported by a metal jig (not shown), for example, prior to addition of the molten asphalt. In FIG. 2B, molten asphalt 9 is added to the repaired container. By virtue of the strip 2 adhered to the damaged portion of the container 7, the container does not leak through the aperture. In a preferred embodiment described below, the strip is formulated to closely resemble the color, luster, and/or other visual characteristics of the container in order to camouflage the presence of the strip on either the inside and, preferably, the outside wall.

Figure 3A:
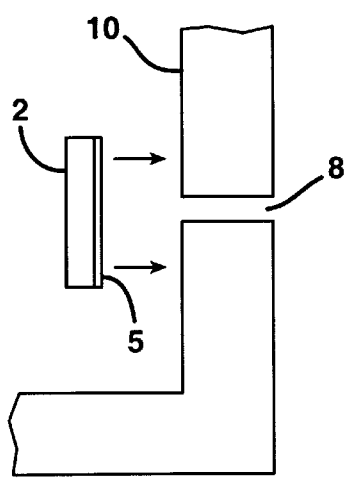
FIG. 3A and FIG. 3B are cross-sectional elevation views of a strip being adhered to an inside wall of a polymer-modified asphalt-based container to seal an aperture in the container wall.
Figure 3B:
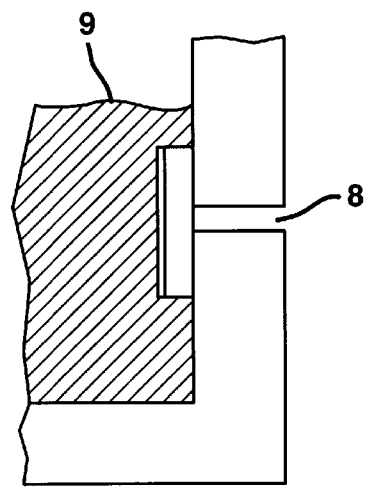

In FIG. 3A–FIG. 3B, an alternative embodiment is shown. Rather than adhering the strip 2 to the outside surface of the container, the strip may be adhered to the inside surface 10 of the container. In yet another embodiment (not shown), a strip of tape is adhered to the inside surface and another strip is adhered to the outside surface of the container. It is also possible for the same strip to be adhered to both the inside and outside surface. For example, if the uppermost rim of the container is split down a side, the strip may be applied up the inside surface overlying the damaged portion, around the rim, and down the outside surface, or vice versa.

Figure 4A:
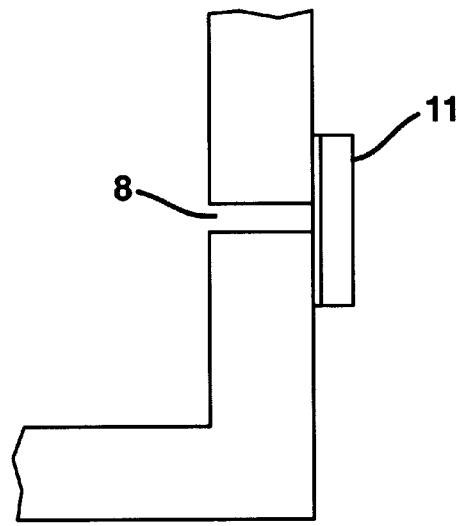
FIG. 4A and FIG. 4B are cross-sectional elevation views of a heat shrinkable strip adhered to an outside wall of a polymer-modified asphalt-based container to seal an aperture in the container wall.
Figure 4B:
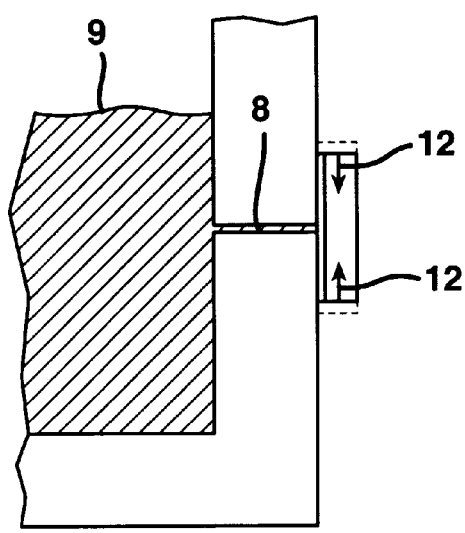

In FIG. 4A–FIG. 4B, a heat shrinkable strip 11 of material is used to repair a damaged region of the container. The method is similar to that shown in FIG. 2A, 2B and as described above, but upon transfer of heat from the molten asphalt 9 directly to the heat shrinkable strip or indirectly through the container wall, the strip material relaxes its molecular orientation thereby shrinking to impart a force 12 causing the opposing faces of the aperture 8 to draw more closely together. This drawing together tends to reduce the likelihood of leaks developing and improves the overall structural integrity of the container. The dimensions of the tape shrink by about 0–20%, preferably by about 5–10%. Analogous to FIG. 3A–FIG. 3B, the heat shrinkable strip may be applied to the inside surface of the container, or to both the inside and outside surface of the container.

The heat shrinkable strips may be made from a variety of materials known to those skilled in the art. Among the possible heat shrinkable materials are linear low density polyethylene, MYLAR® or other type polyester, and SURLYN® or other type thermoplastic synthetic resin.

By whatever technique the damaged portion of the container is repaired by an adhesive strip, molten asphalt is added to the repaired container. If necessary or desired, the repaired container may be supported by a metal jig to prevent accidental tipping of the container before, one-half inch to one inch below the rim of the container. The asphalt filled container is then allowed to cool, typically for at least about 24 hours, before being transported or stacked onto other asphalt filled containers. When needed, the repaired container and its asphalt contents are consumed by commingling the container with a mass of melted asphalt, such as asphalt remelted in an asphalt melting apparatus.

Any container capable of containing molten asphalt at the pour temperature without deleterious deformation and made from a material which either melts or solubilizes in asphalt at remelt conditions can be used in the instant method. The temperature at which the asphalt is poured or otherwise added to the container will vary depending on the type of asphalt used. The asphalt pour temperature is generally 230° F.–270° F. for paving asphalt and generally 270° F.–350° F., more preferably 290° F.–330° F., and most preferably 290° F.–310° F., for roofing asphalt. Accordingly, the container should withstand temperatures of up to 310° F., more preferably up to 330° F., and most preferably up to 350° F. without deleterious deformation. Deformation of the container is deleterious if it precludes containment of the desired quantity of asphalt or otherwise significantly damages the integrity of the container. Slight warping or slight deformation of the container is not considered deleterious deformation. "Remelt conditions" refer to the composition, temperature and other conditions in the asphalt remelting kettle. For example, in the case of roofing asphalt, the remelt temperature is 450° F.–600° F., more preferably 450° F.–550° F. to avoid asphalt flashing, and most preferably 450° F.–530° F. to avoid or reduce thermal cracking of the asphalt.

A preferred container is made from polymer-modified asphalt, as described in U.S. Pat. No. 5,733,616 issued to Janicki et al., which is hereby incorporated by reference. In particular, the preferred container may be made from any of the combinations of modifying polymers and asphalt disclosed in the Janicki patent. Most preferably, the container is a TruMelt® brand asphalt container available from Owens Corning Corporation, Toledo, Ohio. The damaged containers with which this invention is to be used are those having a structural defect, such as a crack, split, hole, or other type aperture, which allows the fluid contents of the container to leak. The invention is especially well suited for repairing containers adapted for storing processed, e.g., air-blown, asphalt, raw asphalt, tars, and pitches.

The strips for use in the instant method will exhibit certain desired properties. The strips must be strong enough to "hold together" the damaged container. This desired attribute of the strip requires that it have both a sufficiently high tensile strength and adequate adhesion to the container.

The longitudinal tensile strength of the strip should be at least 20 lb/in, and preferably about 25–33 lb/in or more. The transverse tensile strength should be 40–50 lb/in or more. The elongation to break may be about 110–120%.

The adhesive must adhere the strip strongly enough to the container wall at the temperatures to be encountered, such as during the asphalt pour step, as to provide an adequate seal, preferably a leak-proof seal, at least until the asphalt in the repaired container has solidified. Preferably, adhesive tapes of the instant invention will show an adhesion strength of at least 14 oz/in. Preferably, the adhesion strength will be at least 18 oz/in, even more preferably at least about 50 oz/in.

A wide variety of adhesives are believed to be suitable for use in the present invention. Acrylic based adhesives are preferred for their good aging properties and good high and low temperature adhesive properties. Natural rubber based adhesives show good low temperature adhesion and good high shear adhesion.

The strip of material is made from a material which is compatible and assimilates with melted asphalt at the conditions encountered in the asphalt melting kettle, but which does not melt upon addition of the molten asphalt to the repaired container. The term "assimilate" means melting or solubilizing in asphalt at or below the temperature at which the asphalt is heated during the remelt step. As noted above, roofing asphalt remelt temperatures generally range from 450° F. to 600° F., preferably 450° F. to 550° F., most preferably from 450° F. to 530° F. If assimilation of the strip occurs by way of melting, then the adhesive tape should melt at less than 500° F., preferably less than 420° F. For any given type of asphalt contained in the consumable containers, therefore, the adhesive tape suitable for use in this invention melts and/or solubilizes in the asphalt melt at or below the melt temperature.

Preferably, the strip material is made from a polymer material. In general, the polymer material can be any polymer or mixture of polymers that is compatible with the asphalt and can be used to form a strip for use in an adhesive tape having the desired physical properties. Exemplary polymers that may be used as a component of the polymer material include polymers selected from ethylene, propylene, ethylene-propylene copolymers, and butylene copolymers. In addition, copolymers of acrylates and methacrylates, such as butyl, propyl, ethyl, or methyl acrylate or methacrylate copolymerized with ethylene, propylene, or butylene, can be used. Also, epoxy-functionalized copolymers can be used, for example, a terpolymer of ethylene, butyl acrylate and glycidyl methacrylate, such as Elvaloy® AM available from E. I. du Pont de Nemours & Co. (Wilmington, Del.). A natural or synthetic rubber can also be used, such as styrene-butadiene-styrene (SBS), styrene-butadiene rubber (SBR), styrene-ethylene-butylene-styrene (SEBS), or terpolymer made from ethylene-propylene diene monomer (EPDM).

Preferably the polymer material includes an ethylene-vinyl acetate copolymer with a vinyl acetate content from about 9% to about 40% by weight, so that it is sufficiently soluble in asphalt. Ethylene-vinyl acetate copolymers with a softening point of at least about 150° C. can improve the melt resistance of the tape during pouring of the asphalt. Preferred ethylene-vinyl acetate copolymers are the "Elvax" series from Dupont, such as Elvax 360 through 750, preferably Elvax 450 or 470. Ethylene-vinyl acetate copolymers are also available from USI Chemicals under the trade names "Ultrathene" and "Vynathene."

A preferred additional polymer component of the polymer material is one that enhances high-temperature stability, such as polypropylene (PP) having a melting point of 163° C. and a crystallinity of 40%. Particularly preferred is biaxially oriented polypropylene. Mixtures of polypropylene and EVA in the ratio of about 1:1 to 5:1, preferably about 3:1, by weight are especially preferred.

The tape is preferably sufficiently soluble in molten asphalt such that use of the tape-repaired containers does not significantly change the properties of the molten asphalt in the remelting kettle. Accordingly, the asphalt including at least one tape-repaired container preferably meets the requirements of the desired type of roofing asphalt according to ASTM D312. The contents of the asphalt remelter should have a solubility in trichloroethylene of at least 99%. Preferably, the packaged asphalt comprising the repaired container filled with raw or processed asphalt has a solubility in trichloroethylene of at least 99%.

While clear polypropylene is suitable, the shiny luster of commercially available biaxially oriented polypropylene adhesive tape tends to draw undesired attention to the presence of the tape when it is applied to the outside surface of the container. Accordingly, in an alternative preferred embodiment, a coating of suitable adhesive may be applied to the strip material. The adhesive may be applied by any conventional technique, such as roller coating, brushing, etc. A preferred form of the strip, however, is in the form of a pressure sensitive adhesive tape.

In light of the need for strong adhesion and high strength of the adhesive tape at the temperatures at which the molten asphalt is poured into the container on the one hand, and the requirement that the adhesive tape melt or solubilize in the asphalt remelter, it is preferred that the asphalt be added to the container at the lowest practical temperature possible. By adding molten asphalt to the container at temperatures no higher than necessary to effectively transfer the asphalt to the container, it is believed that the range of potentially suitable combinations of strip materials and adhesives is not unduly limited. Preferably, the adhesive tape will not melt and will retain sufficient strength and adhesion to the container as high as about 300° F.–305° F.

The adhesive tape may be provided in a wide variety of physical forms, such as indefinite length rolls and discrete length strips. A preferred form is an indefinite length elongated strip spooled onto a roll core. A variety of convenient widths is possible, such as about 25–72 mm wide, e.g., 48 mm wide. The tape is wide enough so that one straight section severed from the roll will span across the crack, split, or hole in the damaged container in need of repair. Another preferred form of adhesive tape is discrete lengths of adhesive tape. Preferably, these discrete lengths are sized for convenient use with the containers. As in the case of the tape rolls, a convenient discrete length tape for use with TruMelt® brand containers is approximately 48 mm to 72 mm wide. Regardless of form of the adhesive tape, the tape thickness can also vary widely. The tape thickness may be about 1–5 mil thick, preferably about 1–4 mil, and more preferably about 1.8–2.5 mil thick.

An especially preferred adhesive tape is a pressure sensitive adhesive tape including a biaxially oriented polypropylene layer with an acrylic adhesive that is commercially available from 3M Company, Minneapolis, MN. Any of the 3M Series 371 or Series 373 tapes may be used. In particular, catalog no. 3710 is a non-reinforced box sealing tape that is 1.5 mil thick. It is available in widths ranging from 48–72 mm and a length of 100 m. Non-reinforced high performance printed box sealing tape catalog no. 3734 can also be used. The tape thickness is 2.6 mils. Rolls are 48 mm wide and 50 yards long. The adhesion strength is 50 oz/in. The tensile strength is 30 lb./in.

Preferably, the adhesive tape is provided in a form having appropriate release properties. If provided in roll form, conventional techniques or materials may be included in or on the backside of the strip itself or formulated with the adhesive to facilitate unrolling the adhesive layer from the upper surface of the underlying strip layer. If the strip is provided in discrete lengths, a protective release-coated backing strip covering the adhesive layer may be provided. Like the strip, the backing preferably is capable of melting or solubilizing with the asphalt melt so that the release strip itself can be reclaimed as well. Insofar as the release strip is not adhered to the container, however, it may be disposed of as solid waste if necessary. In that case, the release strip need not assimilate with the contents of the remelter. Further, the release strip need not exhibit the same or similar degree of strength as the strip since the release strip is not intended to be adhered to the damaged container.

Pigments may be incorporated into the composition of the strip, or a separate pigment coating layer may be applied to the laminar structure of the adhesive tape for aesthetic reasons and to camouflage the presence of the strip on the container. It is believed that while a substantially clear adhesive tape will not unduly detract from the aesthetic appearance of the repaired container, it may be advantageous to camouflage the presence of the adhesive tape on the repaired container by colorizing the adhesive tape to closely resemble the color of the polymer-modified asphalt container itself. This may be accomplished, for example, by incorporating a conventional pigment in the strip, or applying the same to the strip as a separate layer. A small amount of asphalt, such as 1–3% by weight, may be added to the strip thereby substantially matching the color of the adhesive tape with that of the container. Other conventional colorizing agents, such as carbon black may also be used.

Double-sided adhesive tape according to this invention can also be used. After application of the double sided tape to the container, ground-up container material, e.g., material in powder form, can be dusted over and adhered to the exposed face of the double-sided tape.

The process of adhering the strip material to the container may involve some additional surface preparation steps. For example, the container surface Should be clean of foreign material, such as dirt or dust, and the surface should be dry. If necessary or desirable, the surface may be prepared by a surface roughening step to increase the interfacial contact surface area between the adhesive and the container. A variety of other surface preparation techniques may be employed to improve the adhesion between the container and the strip so long as the treatment method is not incompatible or otherwise deleterious to the container and its ability to retain the molten asphalt. One such adhesion-enhancing treatment is flame treatment, for example.

Preferably, the adhesive tape should not cause or exacerbate release of unpleasant fumes during remelting of the asphalt. The adhesive tape of the present invention will also preferably by age-resistant. That is, the adhesive tape will show long-term resistance to aging from exposure to UV light, air, and heat. Such resistance is intended to prevent yellowing during extended storage. A variety of conventional additives, including UV absorbers, such as benzophenone or equivalent type UV absorbers, may be formulated into the tape to improve age resistance.

The strip of this invention may include fiber reinforcements so long as the fiber reinforcements assimilate in the asphalt at the remelt conditions. For example, a strapping tape reinforced with nylon-6 fibers is within the scope of this embodiment of the invention. Nylon-6 has a melting point of about 430° F. which will assimilate in an asphalt remelt kettle at a temperature of 450° F. to 550° F.

While it is preferred that adhesive tape be applied to both the inner and outer surfaces of the damaged container for strength and for "double walled" leak protection, the adhesive tape may be applied to only one surface, preferably the inner surface, for several reasons. First, the presence of an adhesive tape strip visible from the outside of the asphalt-filled container may detract from the overall container aesthetics. Use of a pigmented adhesive tape on the outside of the container, as discussed above, may effectively address this concern.

What is claimed is:

1. A method comprising:
    a) providing a container for molding asphalt, said container having a damaged portion characterized by an aperture through which molten asphalt could flow;
    b) adhering a first non-reinforced strip to the damaged portion overlying the aperture thereby forming a repaired container, wherein the strip is biaxally oriented and is assimilable in asphalt; and
    c) adding molten asphalt to said repaired container causing the biaxally oriented strip to relax thereby causing the portions of the container adhered to the strip to be pulled together.

2. The method of claim 1 wherein the container is injection-molded from a consumable polymer-modified asphalt-based composition.

3. The method of claim 2 wherein the composition comprises, by weight, from about 40 to about 90% of an asphalt and from about 10 to 60% of a polymer material.

4. The method of claim 1 wherein the strip is age resistant.

5. The method of claim 1 wherein the strip has a melting point of about 360° F. to about 500° F.

6. The method of claim 5 wherein the melting point is about 360° F. to about 420° F.

7. The method of claim 1 wherein the longitudinal tensile strength of the strip is at least about 20 lb/in.

8. The method of claim 7 wherein the transverse tensile strength is at least about 40 lb/in.

9. The method of claim 7 wherein the strip is about 1–5 mils thick.

10. The method of claim 9 wherein the strip is about 1.8–2.5 mils thick.

11. The method of claim 1 wherein the strength of adhesion between the strip and the container is at least about 14 oz/in.

12. The method of claim 1 wherein the strip is pre-coated with pressure-sensitive adhesive.

13. The method of claim 12 wherein the strip is made from polypropylene and the adhesive is an acrylic adhesive.

14. The method of claim 1 wherein the first strip is adhered to the inside surface, the strip is characterized by a strip melting point, and the molten asphalt is added at a temperature below the strip melting point.

15. The method of claim 14 further comprising adhering a second strip to the outside strip, wherein the second strip assimilates in asphalt.

16. The method of claim 15 wherein the second strip is adhered to said damaged portion.

17. The method of claim 1 wherein the molten asphalt added in step (c) is selected from the group consisting of raw asphalt and blown asphalt.

18. The method of claim 1 wherein the asphalt is added at a temperature of from about 270° F. to about 330° F.

19. The method of claim 18 wherein the asphalt is added at a temperature of about 290° F. to about 310° F.

20. The method of claim 1 further comprising the step of supporting the container prior to step (c).

21. The method of claim 20 wherein the container is supported by a metal jig to facilitate cooling of the molten asphalt.

22. The method of claim 1 further comprising:
   (d) stacking a plurality of containers containing solidified asphalt.

23. The method of claim 22 wherein the added molten asphalt is allowed to cool for about 24 hours before stacking.

24. The method of claim 1 further comprising:
   (d) melting the container, solidified asphalt, and strip.

25. The method of claim 24 wherein the container, solidified asphalt, and strip are melted in an asphalt melting kettle.

26. A method comprising:
   a) providing a meltable asphalt container for molding asphalt; said container having an inside surface, an outside surface, and a damaged portion characterized by an aperture through which molten asphalt could flow; and
   b) adhering a biaxally oriented first strip to the damaged portion overlying the aperture, whereby the strip contains reinforcing fibers that can assimilate in molten asphalt at a temperature of at least 450° F.
   c) adding molten asphalt to said repaired container causing the biaxally oriented strip to relax thereby causing the portions of the container adhered to the strip to be pulled together.

27. A method comprising:
   a) providing a container for molding asphalt, said container having a damaged portion characterized by an aperture through which molten asphalt could flow; and
   b) adhering a first non-reinforced biaxally oriented strip to the damaged portion overlying the aperture thereby forming a repaired container,
   c) adding molten asphalt to said repaired container causing the biaxally oriented strip to relax thereby causing the portions of the container adhered to the strip to be pulled together.

* * * * *